US009782888B1

(12) United States Patent
Schulz

(10) Patent No.: US 9,782,888 B1
(45) Date of Patent: Oct. 10, 2017

(54) TRUSS JIGGING SYSTEM

(71) Applicant: Jack A. Schulz, Monett, MO (US)

(72) Inventor: Jack A. Schulz, Monett, MO (US)

(*) Notice: Subject to any disclaimer, the term of this patent is extended or adjusted under 35 U.S.C. 154(b) by 461 days.

(21) Appl. No.: 14/510,515

(22) Filed: Oct. 9, 2014

Related U.S. Application Data

(60) Provisional application No. 61/888,570, filed on Oct. 9, 2013.

(51) Int. Cl.
*B23Q 1/28* (2006.01)
*B25H 1/10* (2006.01)

(52) U.S. Cl.
CPC .................................... *B25H 1/10* (2013.01)

(58) Field of Classification Search
CPC .. B25B 11/02; B25H 1/02; B25H 1/06; B25H 1/08; B25H 1/10
USPC ...................... 29/281.1, 291.3; 100/48, 913; 227/152–155; 269/37, 43, 111, 250, 251, 269/304, 910
See application file for complete search history.

(56) References Cited

U.S. PATENT DOCUMENTS

| | | | | |
|---|---|---|---|---|
| 4,943,038 | A * | 7/1990 | Harnden | B23Q 1/4804 269/320 |
| 5,048,409 | A | 9/1991 | Schulz | 100/48 |
| 6,318,251 | B1 | 11/2001 | Schulz | 100/48 |
| 6,702,269 | B1 * | 3/2004 | Tadich | B27F 7/155 269/304 |
| 7,922,158 | B2 | 4/2011 | Fredrickson | 269/37 |
| 2009/0084468 | A1 * | 4/2009 | Koskovich | B27F 7/155 144/345 |
| 2016/0023312 | A1 * | 1/2016 | Svensson | B23P 21/00 29/281.1 |

* cited by examiner

*Primary Examiner* — William Gilbert
(74) *Attorney, Agent, or Firm* — Jonathan A. Bay

(57) ABSTRACT

A truss jigging system has an elongated table forming a support plane and formed with a plurality of parallel slots extending between the two long edges. The table has a plurality of the following: locating pins, carriages, endless belts, idler wheels, and, drive wheels. Each endless belt is strung around a respective one of the idler wheels and a respective one of the drive wheels to form a pair of elongated runs, one run being an elongated return run and the other run having a respective one of the carriages affixed thereto and coursing through a respective slot such that, driving the drive wheel moves the locating pin back and forth along the front to back axis of the respective slot.

20 Claims, 22 Drawing Sheets

TRUSS JIGGING SYSTEM

CROSS-REFERENCE TO PROVISIONAL APPLICATION(S)

This application claims the benefit of U.S. Provisional Application No. 61/888,570, filed Oct. 9, 2013, the disclosure of which is fully incorporated herein by this reference thereto.

BACKGROUND AND SUMMARY OF THE INVENTION

The invention relates to work holders and, more particularly, to a truss jigging system with provisions for reducing the length of time between changing from one jig formation to another.

Home architects are always striving for new and fresh designs to appeal to the new home buyer and/or home renovator who wants something distinctive. One of the ways to provide fresh new designs is to design elaborate truss-supported structures where nearly every truss has a unique design. Hence there is pressure from the marketplace for truss jigging systems which have a very short times between changing from one jig formation to another.

It is an object of the invention to provide a fully automatic truss jigging system, wherein the time to change jig formation is as short as a minute to just a few minutes. This object of the invention is achieved by controllable drive systems that are driven from a controller and spin a belt. Albeit, it is expected that user will give the controller and manual signal to make the change of the jig formation.

It is an alternate object of the invention to provide a semi-automatic truss jigging system. This is not a backward step from the previous object of the invention. Instead, this allows for, among other things, a user to make a last second personal intervention to make fine, last-minute adjustments.

It is a further object of the invention to a truss jigging system with manual drives for changing the jig formation (eg., like a hand crank or a wrench put to service as a hand crank). And again, this object is also not a backward step from the previous two. When architects and/or builders are designing and constructing a distinctive and elaborate structure, the unexpected might happen. There might be a need to make a last truss based on measurements made by the builder in the field. The manual drive provisions might make the changeover time a lot slower than the fully automatic and semi-automatic provisions. However, when workers feel like they aren't getting exactly what they need, and to the point where they mistrust the computers, the manual speed-drive provisions restore the jig template formation fully back to humans.

These and other aspects and objects are provided according to the invention in a truss jigging system comprising the following.

There is a table forming a support plane on which work pieces are supported and extending between a front edge and a spaced-away back edge and being elongated side to side between a left side edge and a spaced-away right side edge.

The table is formed with a plurality of elongated, narrow surface slots through the support plane and extending on generally parallel axes to each other in the front to back direction, the surface slots being recessed down in the table to widen out into enlarged, tubular slideways that are spaced below the support plane and correspondingly are elongated and extend generally parallel with the same axis as the respective surface slot.

There are a plurality of locating pins, and, a plurality of carriages for not only inserting into the slideways for sliding transit therein but also for carrying one of the plurality of locating pins for sliding transit therewith while the locating pin extends through the surface slot and protrudes above the support plane.

There is furthermore a plurality of endless belts, one each for each carriage, and, a plurality of idler wheels, one each for each slideway, and each disposed proximate the front edge of table to service a respective one of the slideways, as well as, a plurality of drive wheels, one each for each slideway, and each disposed proximate the back edge of table to service a respective one of the slideways.

Wherein, each endless belt is strung around a respective one of the idler wheels and a respective one of the drive wheels to form a pair of elongated runs, one run being an elongated return run and the other run having a respective one of the carriages affixed thereto and coursing through the respective slideway that the respective two wheels service, such that, driving the drive wheel moves the locating pin back and forth along the front to back axis of the respective surface slot.

It is optional that the table defines a plurality of inverted-T shaped slots wherein the vertical parts correspond to the surface slots and horizontal parts correspond to the slideways.

The table might further comprises a pair of parallel jigging bars for each inverted-T shaped slot.

The table might moreover further comprises a support deck below the level of and for supporting the jigging bars, the support deck extending between a front edge and a spaced-away back edge and being elongated side to side between a left side edge and a spaced-away right side edge.

Preferably, the jigging bars have top surfaces level with the support plane. and The table might correspondingly comprises a multiplicity of infill sections which are elongated between a front edge and spaced back edge and compact between spaced front and right edges, and sized for filling in between each of the plurality of pairs of jigging bars that define a respective one of the plurality of invert-T shaped slots and are supported by the support deck for presenting a work surface level with the tops of the jigging bars and level with the support plane. It is preferred then that, at least one adjacent pair of a jigging bar and infill section define a tubular conduit parallel to the horizontal part of the inverted-T shaped slot and providing a passageway for the return run of the endless belt.

It is a preferred aspect of the invention to further provide the following:— a second plurality of plurality of locating pins;

a second plurality of carriages for not only inserting into the slideways for sliding transit therein but also for carrying one of the second plurality of locating pins for sliding transit therewith while the locating pin extends through the surface slot and protrudes above the support plane;

a second plurality of endless belts, one each for each of the second plurality of carriages;

a second plurality of idler wheels, one each for each slideway, and each disposed proximate the front edge of table to service a respective one of the slideways;

a second plurality of drive wheels, one each for each slideway, and each disposed proximate the back edge of table to service a respective one of the slideways;

wherein each of the second plurality of endless belts is strung around a respective one of the second plurality of idler wheels and a respective one of the second plurality of drive wheels to form a pair of elongated runs, one run being an elongated return run and the other run having a respective one of the second plurality of carriages affixed thereto and coursing through the respective slideway that the respective two wheels service such that, driving the drive wheel moves the locating pin back and forth along the front to back axis of the respective surface slot; and wherein each slideway services two carriages, one of the first plurality and one of the second plurality, which cannot pass each other but can be driven independently.

The table might further defines a pair of tubular conduits flanking each slideway, one providing a passageway for the return run of the respective one of the first plurality of endless belts and the other providing a passageway for the return run of the respective one of the second plurality of endless belts.

It is preferred to provide a plurality of drive motors, one each for driving a respective one of the plurality of drive wheels, as well as, a control system for controlling the plurality of drive motors.

It is furthermore preferred if the idler wheels are mounted to the table flush below the support plane so that, other than the locating pins and work pieces, the airspace above support plane proximate the front edge of the table is otherwise clear.

The plurality of drive motors may be mounted to the table along the back edge such that the project above the support plane.

For maintenance and adjustment purposes, it is preferred to provide a plurality of belt tensioning systems, one each for a respective one of each of the plurality of belt. Each belt tensioning system might be implemented in the form of comprising a horizontally-adjustable mounting provision that is adjustable back and forth in the front to back direction and provides a mounting provision for one of the drive or idler wheels.

The endless belt can be reckoned as 'endless' in several different ways. One way includes the following. That is, each endless belt includes the respective carriage affixed thereto whereby the carriage forms a splice between opposed tag ends of the belt.

This application is commonly-invented, commonly-owned with U.S. Pat. No. 5,048,409, entitled Truss Fabrication Machine with Joystick Controls, and U.S. Pat. No. 6,318,251, entitled Automatic Control System for a Truss Fabricating Machine, the disclosures of which are incorporated herein by this reference thereto.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

Figure 11:
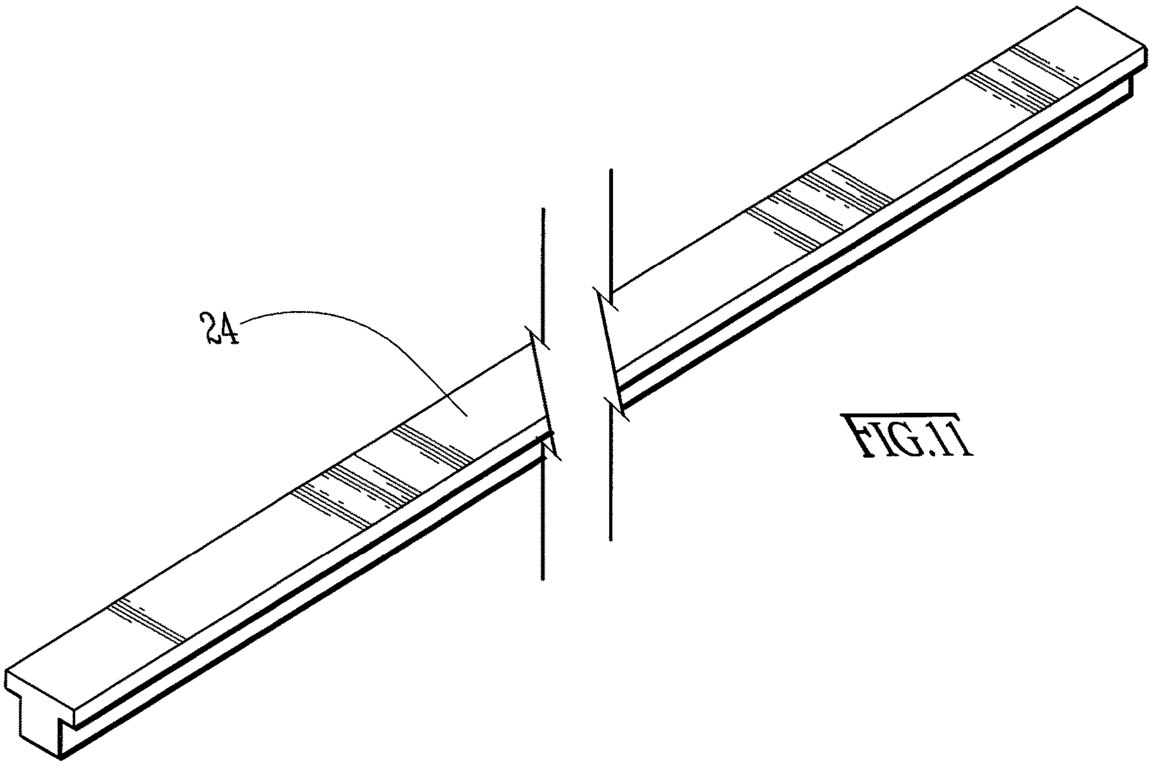
FIG. 11 is an enlarged scale perspective view of detail of a single jigging bar in FIG. 1A or 1B, with central portions broken away.
Figure 12:
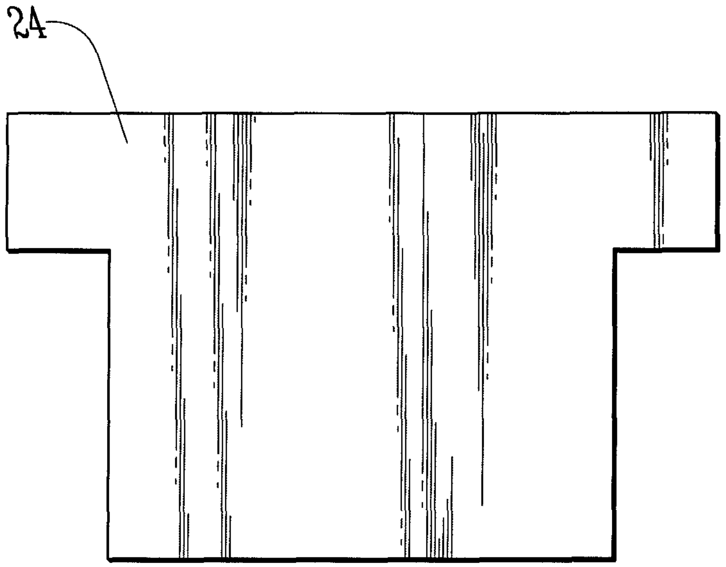
FIG. 12 is an enlarged scale end elevational view thereof.

- that not only the idler system and tensioning system but also a cover therefor have been removed from view to reveal how the carriage and locating pin occupy an inverted-T shaped slot defined by a pair of the T-shaped jigging bars as better shown by FIGS. 11 and 12,
- showing better how the counter-wound endless drive belts are rigged as well,
- showing better how locating puck is mounted on the locating pin above the plane of the top surfaces of the T-shaped jigging bars, and
- additionally showing a pair of infill plates fastened or affixed to the table surface flanking the pair of T-shaped jigging bars, and creating a work surface flush with the elevation of the plane of the top surfaces of the T-shaped jigging bars.

DETAILED DESCRIPTION OF THE PREFERRED EMBODIMENTS

FIGS. 1A through 2B show a truss jigging system 20 in accordance with the invention. It comprises a table deck 22, parallel pairs of jigging bars 24 defining a single slot 26 therebetween and in each slot 26 a pair of pucks 28 are confined to traverse independently of each other, back and forth over the same the slot.

Each of the pair of pucks 28 carried by carriage gear (see, eg., reference numeral 74 in any of FIGS. 13 through 17) the same slot 26 can traverse that slot 26 independently of each other, but the carriages 74 (and hence the pucks 28) cannot pass one another. Accordingly, the pucks 28 can define a spacing between each other. The pucks 28 comprise the work contacting elements of the truss jigging system 20.

Each parallel pair of jigging bars 24 terminates proximate an idler-side edge of the table deck 22 at an combined idler and tensioning system 30 in FIGS. 1A-2B, 7A and 8-10. In contrast, FIG. 7 shows an idler system 31 comprising just simply an idler system alone. The opposite ends of each parallel pair of jigging bars 24 terminate proximate a drive-side edge of the table deck 22 at a drive system 32 in FIGS. 1A-3A, 4A and 5-6. In contrast, FIGS. 3B and 4B an alternate embodiment of a drive system 33 comprising a combined drive system and tensioning system for lining up on the opposite ends of the T-shaped jigging bars 24 as the FIGURE flush mount idler system 31, comprising an idler system alone.

Typically, a line of the pucks 28 for each slot 26 that are closest the drive system 32 or 33 and coursing on a diagonal slant would contact a rafter (or, top chord, and not shown). Correspondingly, the line of pucks 28 for each slot 26 closest to the idler system 30 or 31 would contact a tie beam (or, bottom chord, and not shown). Often, this line of pucks 28 for each slot 26 that are closest to the idler system 30 or 31 are also typically parallel with the idler-side edge of the table deck 22.

Optionally the table deck 22 comprises plate steel stock about a half inch thick. The extent between the idler-side and drive-side edges is preferably in the range of twelve to sixteen feet (~3½m and ~5 m). The extent between a right (near side in FIGS. 1 and 2) and left edge is preferably anywhere from eighty to one-hundred feet (~24 m to ~30 m). The table deck 22 is greatly abbreviated in FIGS. 1A through 2B in order to allow better illustration of the jigging bars 24, idler systems 30 or 31, and drive systems 32 or 33.

Preferably the distance between centers of two adjacent slots 26 is about two feet (or about ~0.6 m). Hence each neighboring set of parallel jigging bars 24 leaves a swath on the table deck 22 that is about seventeen inches (~0.4 m) or so wide. These swaths are in-filled with infill sections 96 (see FIG. 17). These infill sections 96 typically comprise particle board covered by plastic to create more or less a uniform surface for truss components to be arranged upon (not shown), and which corresponds to top elevation of the jigging bars 24.

It can be appreciated now that, a hundred-foot wide truss jigging system 20 is going to forty-nine slots 26, and, ninety-eight drive systems 32 or 33.

Figure 7A:
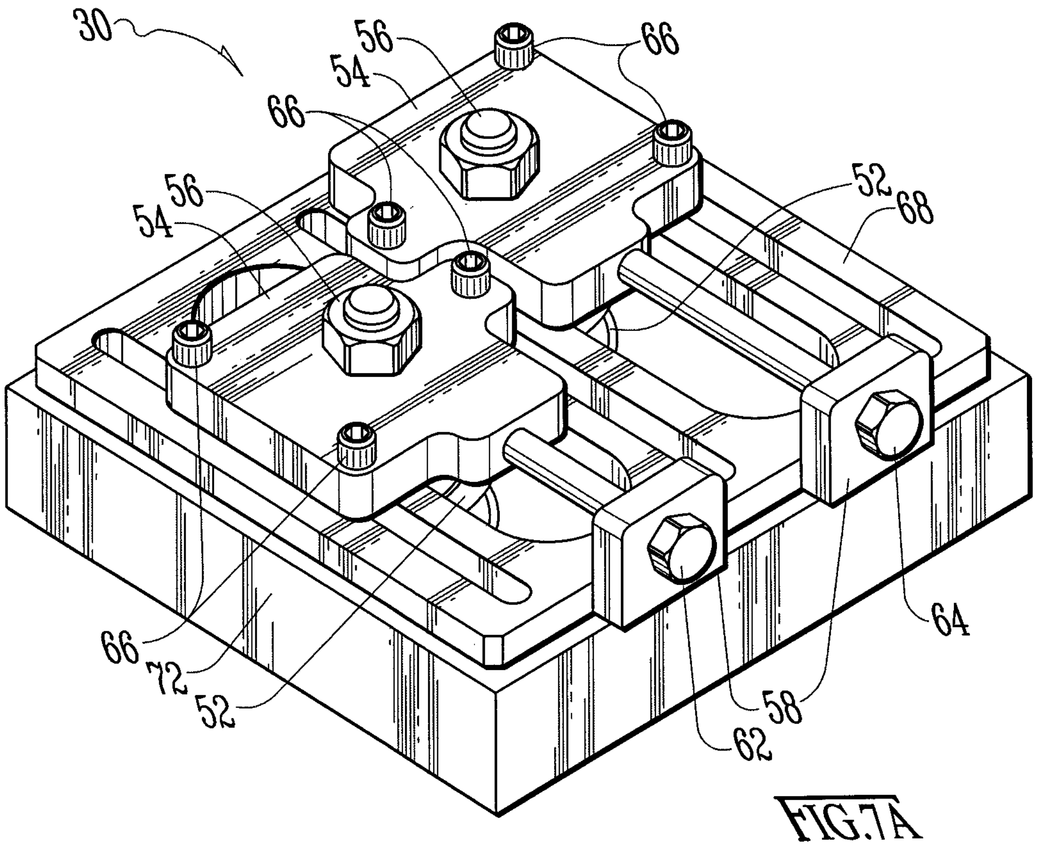
FIG. 7A is an enlarged scale perspective view of detail VIIA in FIG. 2A, comprising an idler system and tensioning system.
Figure 7B:
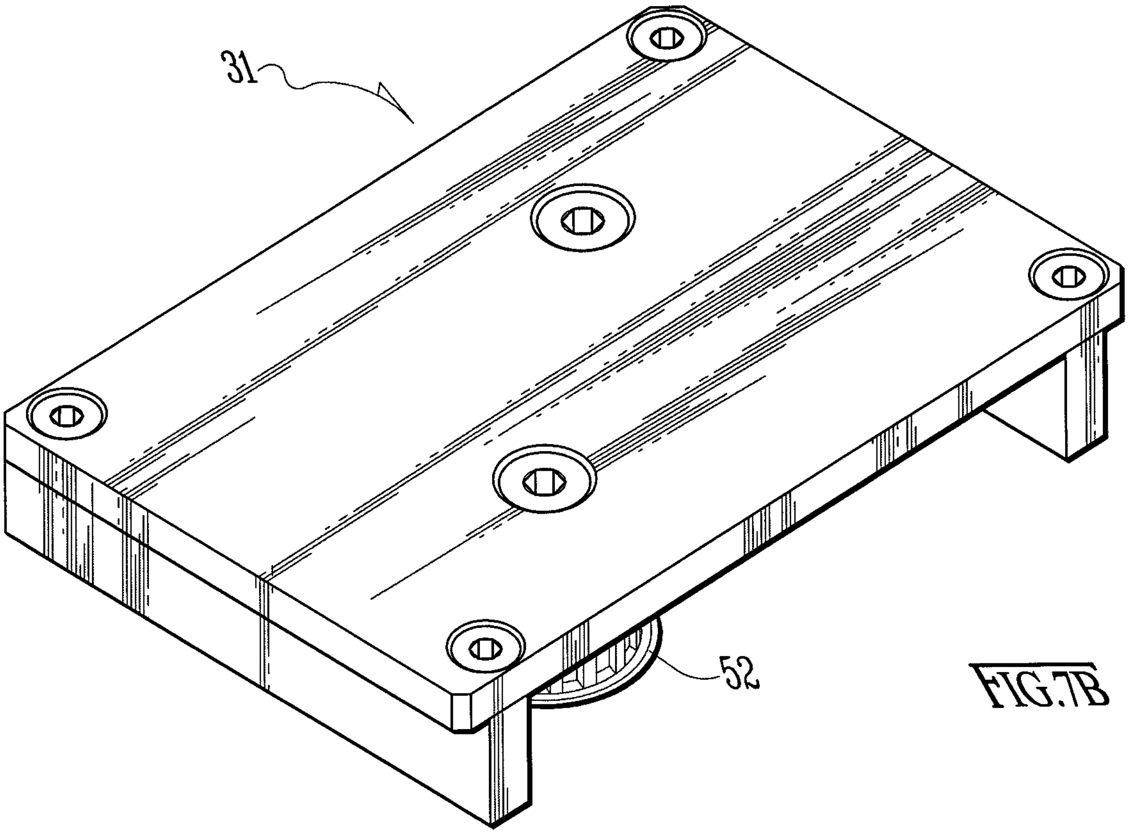
FIG. 7B is an enlarged scale perspective view comparable to FIG. 7B except showing a flush mount idler system, comprising an idler system alone, and for lining up opposite the combined drive system and tensioning system of FIGS. 3B and 4B.
Figure 8:
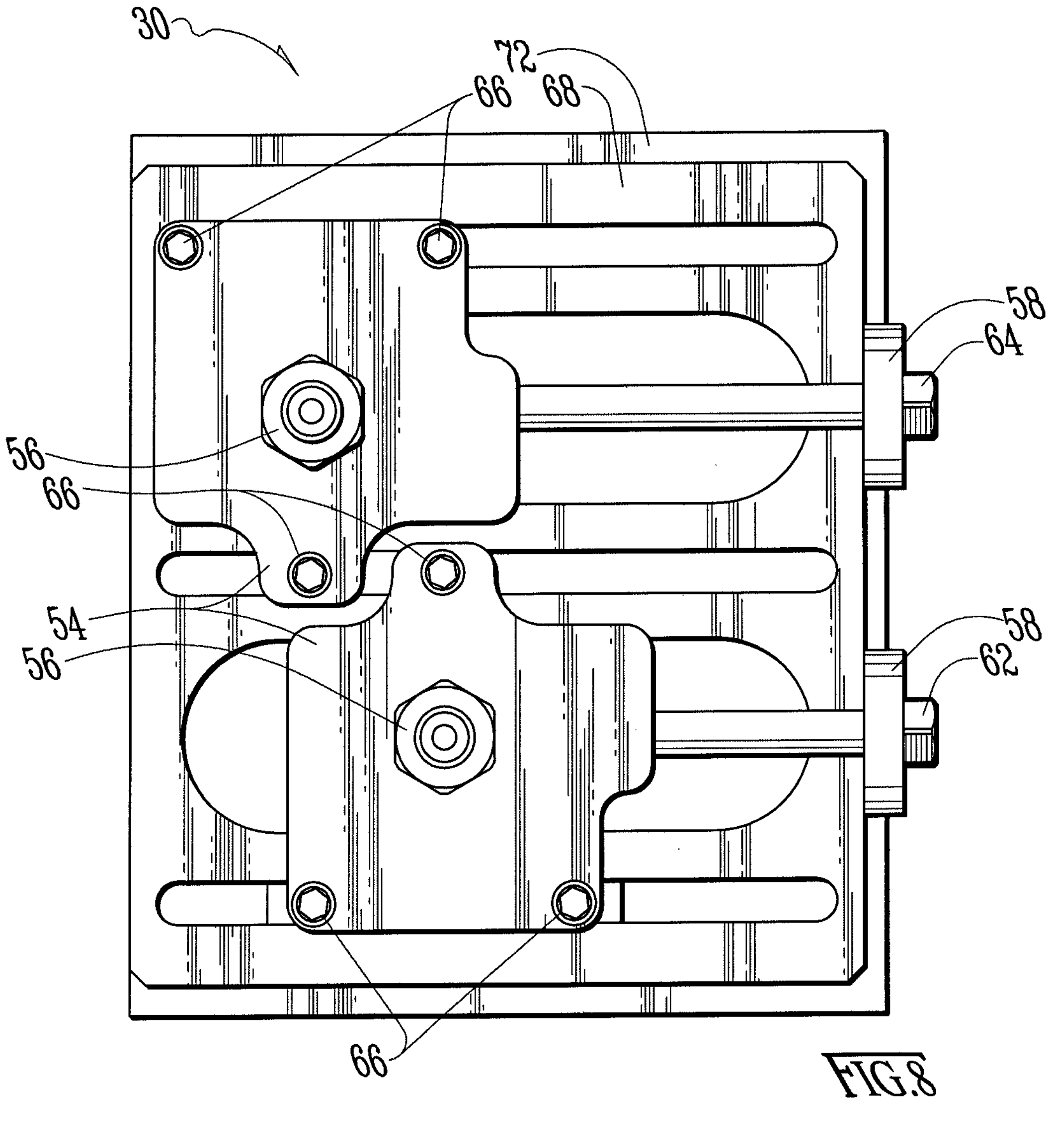
FIG. 8 is a top plan view of FIG. 7A.
Figure 9:
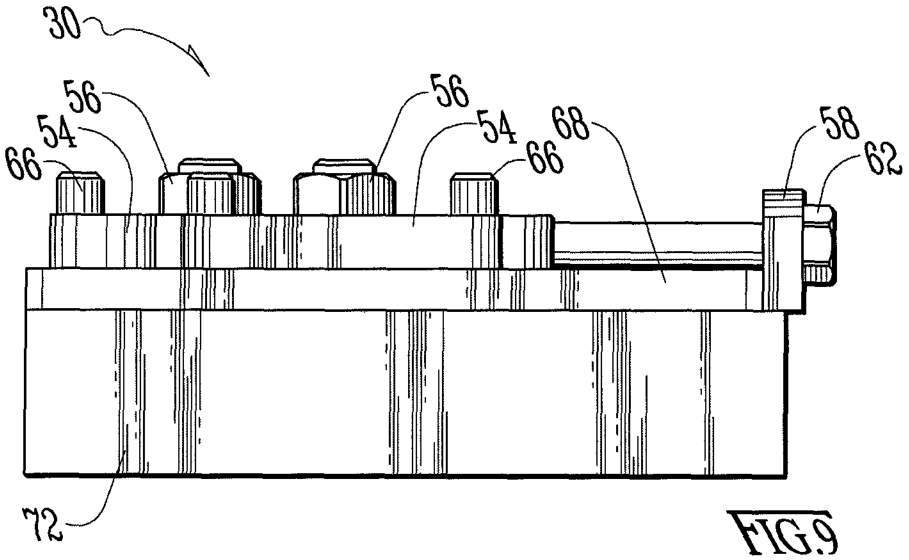
FIG. 9 is a left side elevational view of FIG. 7A.
Figure 10:
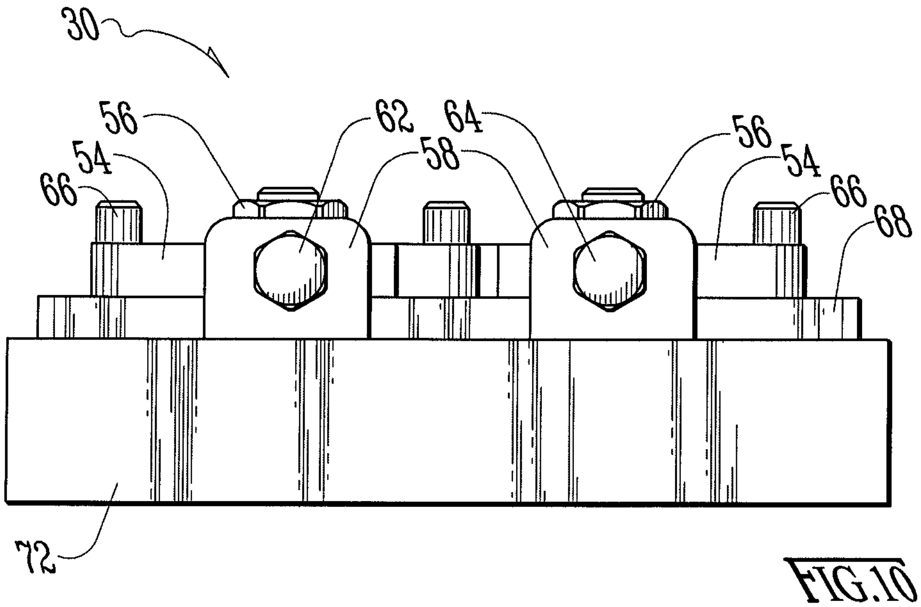
FIG. 10 is an end elevational view of FIG. 7A of the outboard edge.

FIG. 7B shows better that the idler system 31 is mounted on table deck 22 (not shown in FIG. 7B) by flush mounting bolts. This provides a flush mount for this idler system 31. This clears the airspace above the front edge of the truss jigging system 20 in order to allow both truss stock and a completed truss to be slid smoothly on and off over the idler system 31.

FIGS. 3A through 6 show better several aspects of the drive system 32 or 33. Drive system 32 comprises a pair of stepping motors 34, each driving a respective right angle gear 36, the output of which is one or the other of a pair of drive pulleys 38 for driving toothed belts (see, eg., reference numerals 92 and/or 94 in FIG. 17). These toothed belts correspond to or are at least comparable to timing belts. The drive systems 32 and/or 33 are supported off the table deck 22 by means of a C-shaped frame 42 and mounting plate 44 joined by fasteners 46.

FIGS. 7A, and, 8 through 10 show better several aspects of an idler and tensioning system 30. It comprises a pair of idler pulleys 52 counterpart to the pair of drive pulleys 38 in FIG. 3A for providing for the return of a driven toothed belt (see, eg., reference numerals 92 and/or 94 in FIG. 17) driven by each drive pulley 38 in FIG. 3A. The idler pulleys 52 are mounted underneath respective slide plates 54 by shaft nuts 56. The slide plates 54 are pulled in tension relative fixed tabs 58 by respective (short and long) threaded drive rods 62 and 64. Each slide plate 54 has its own set of locking nuts 66 which, when slack, permit the slide plate 54 to pulled in tension relative the respective fixed tab 58. Tightening the locking nuts 66 fixes the slide plate 54 to a stationary position relative mounting plate 68, which is fixed in common with the tabs 58 by C-shaped frame 72.

Figure 1B:
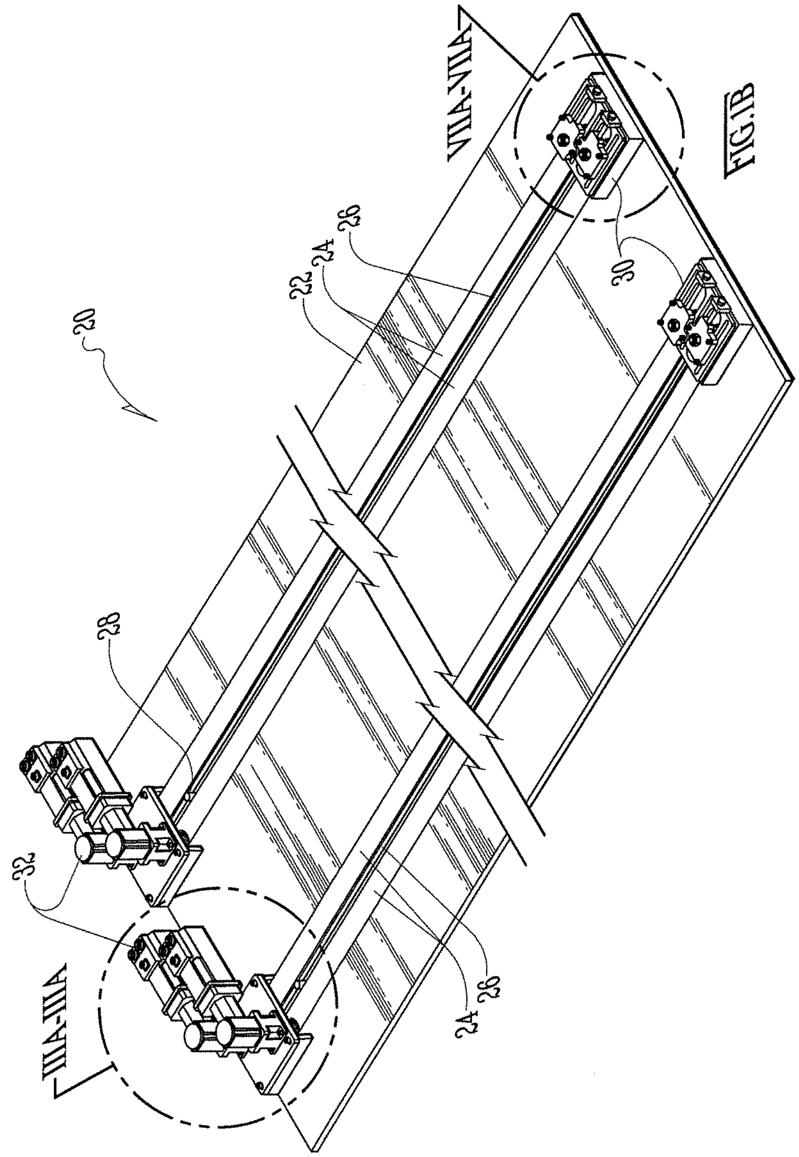
FIG. 1B is a perspective view comparable to FIG. 1A, except on an enlarged scale with further portions token away.
Figure 2A:
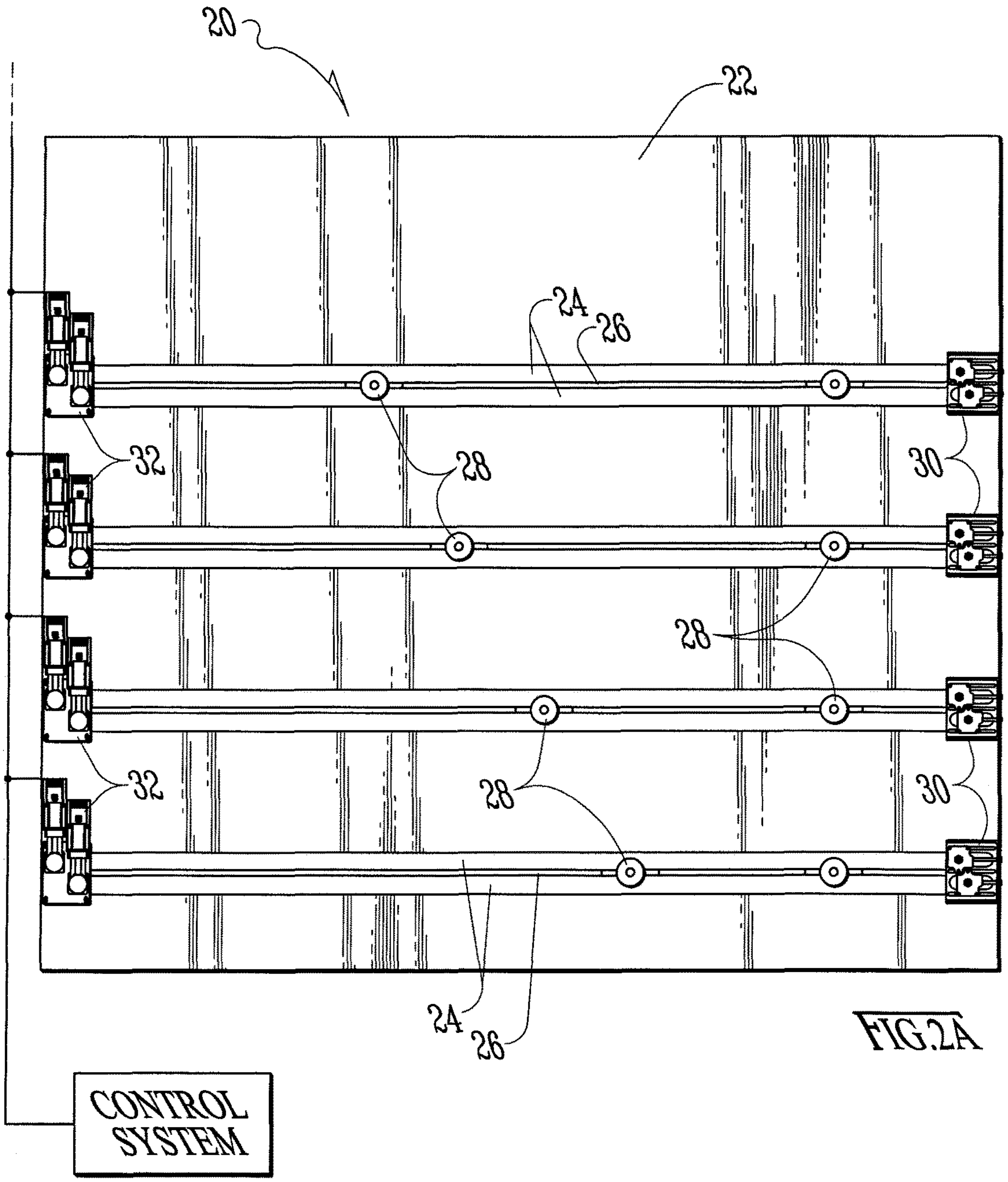
FIG. 2A is a top plan view of FIG. 1A.
Figure 2B:
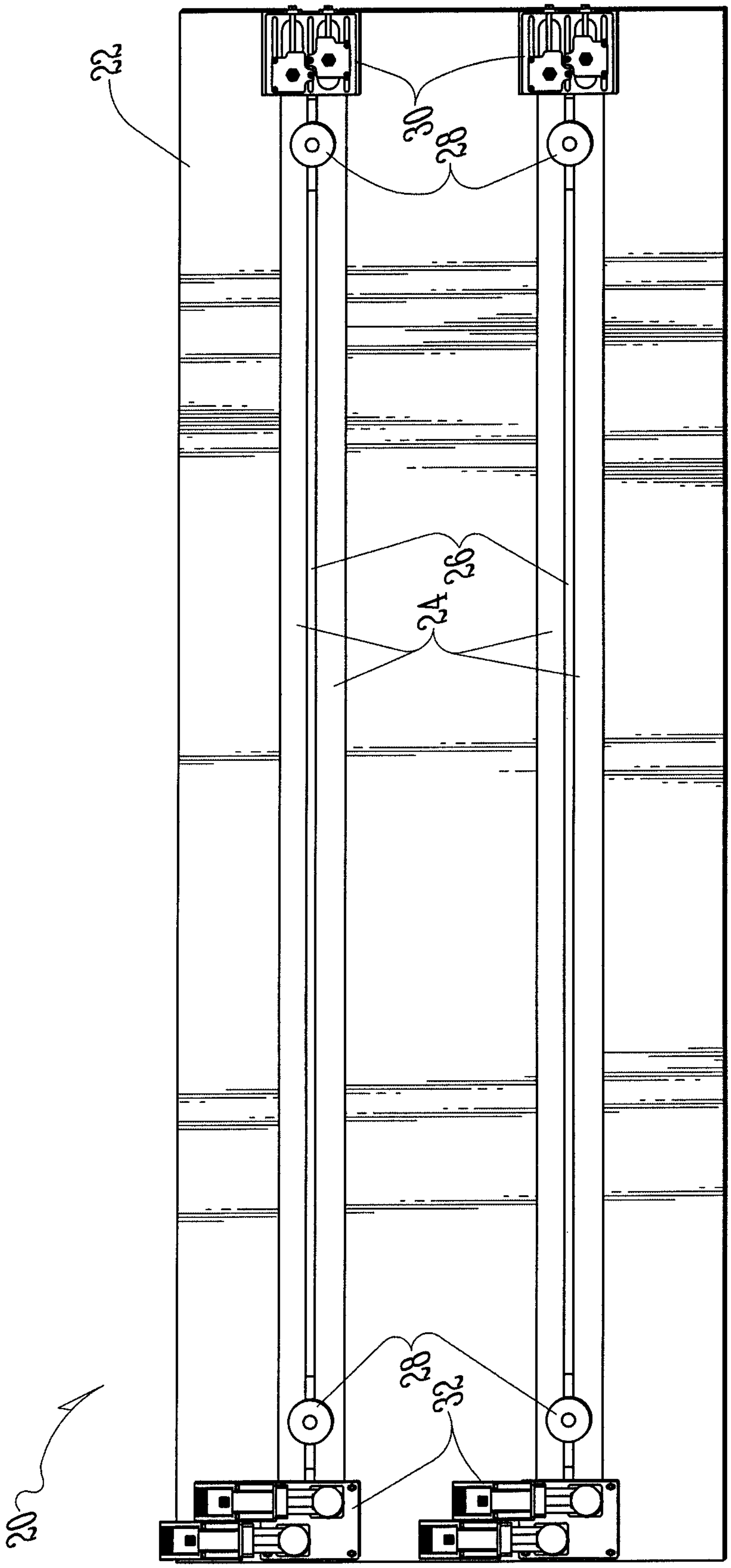
FIG. 2B is a top plan view of FIG. 1B.
Figure 3A:
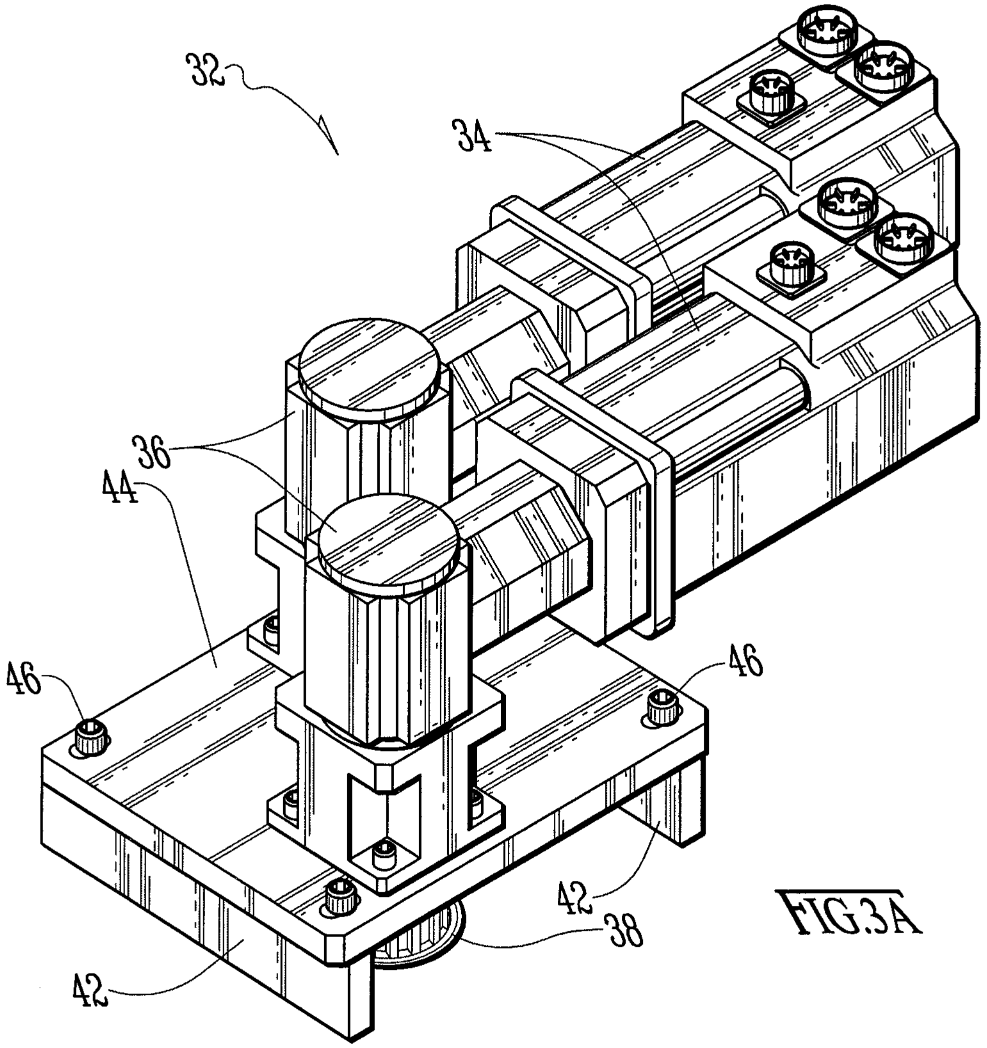
FIG. 3A is an enlarged scale perspective view of detail IIIA in FIG. 2A, comprising a first embodiment of a drive system in accordance with the invention.
Figure 3B:
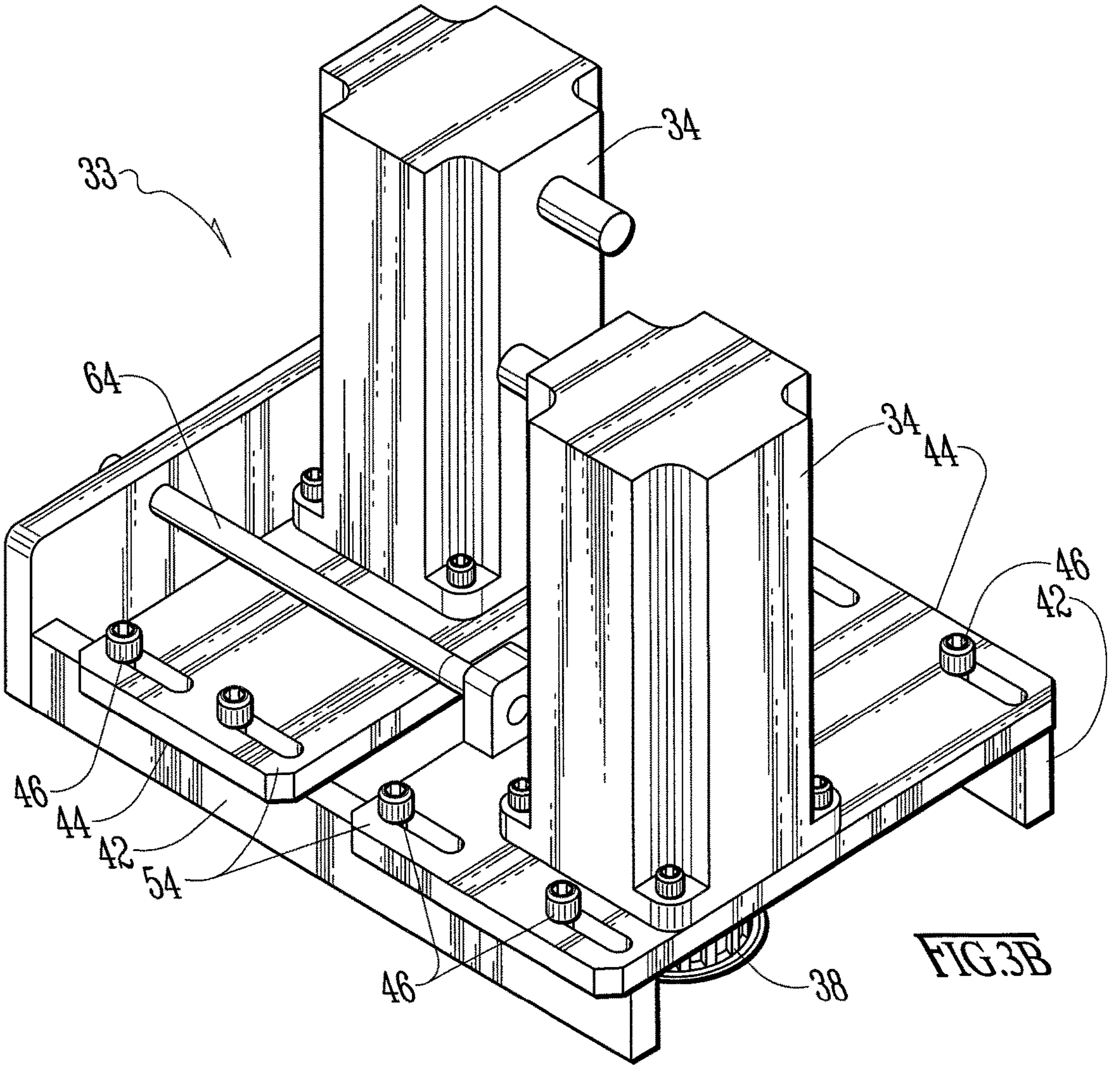
FIG. 3B is a perspective view comparable to FIG. 3A, except of a second embodiment of a drive system in accordance with the invention, comprising not only a drive system but also a tensioning system.
Figure 4A:
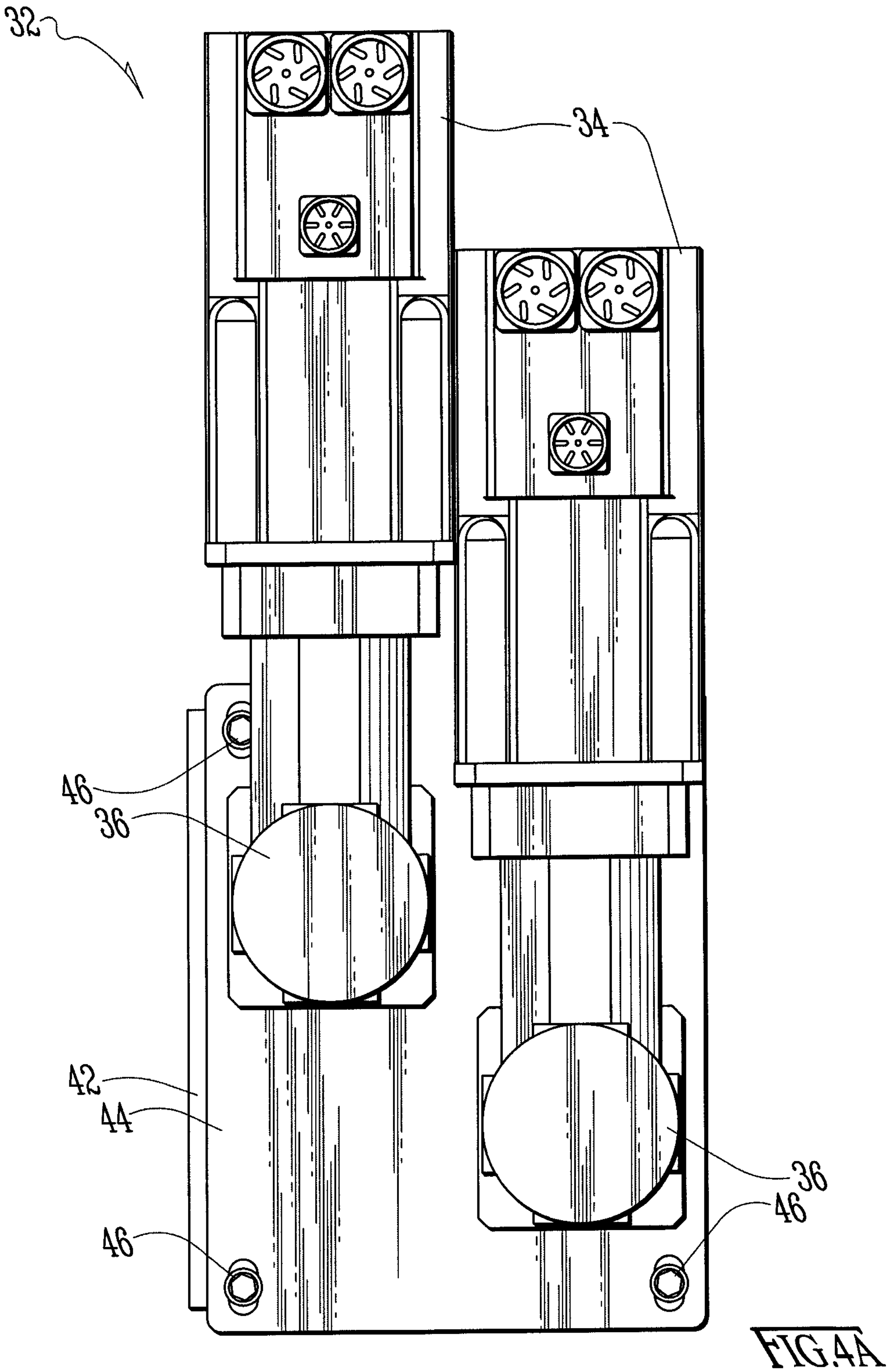
FIG. 4A is a top plan view of FIG. 3A.
Figure 4B:
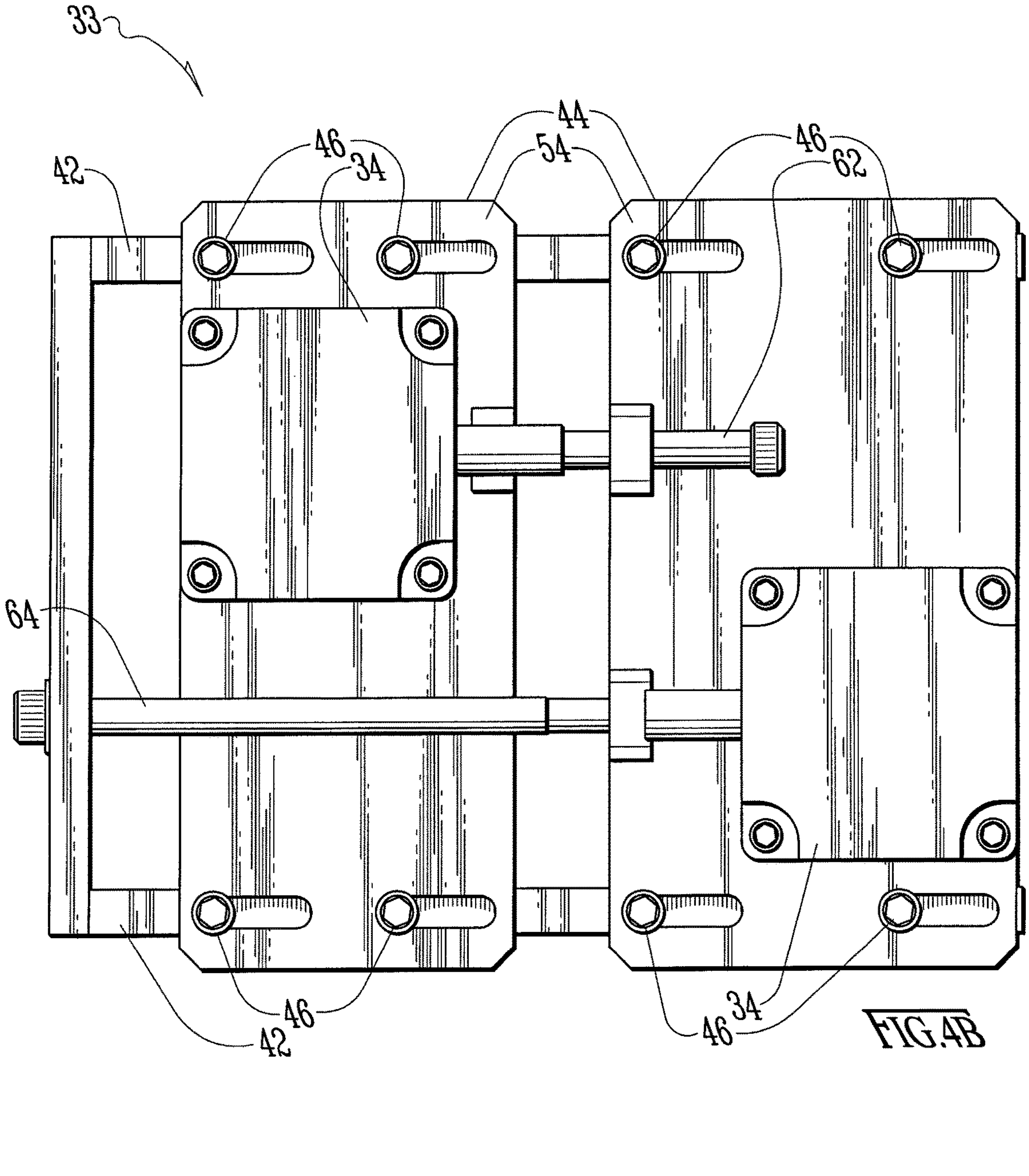
FIG. 4B is a top plan view of FIG. 3B.
Figure 5:
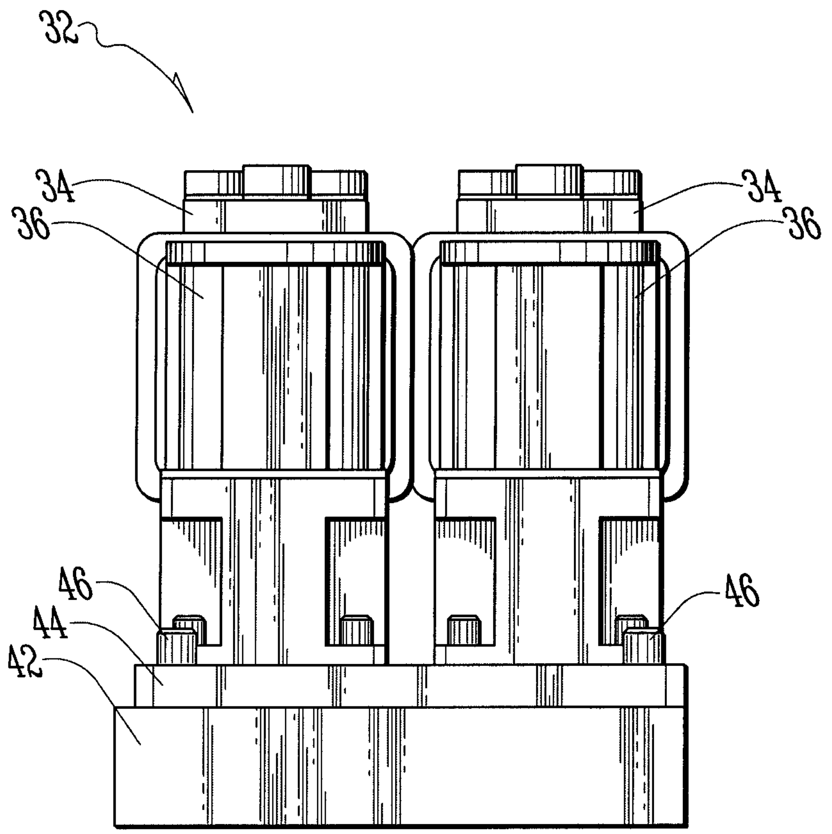
FIG. 5 is a right side elevational view of FIG. 3A.

FIGS. 3B and 4B shows that a corresponding belt tensioning provisions comprising respective (short and long) threaded drive rods 62 and 64 is incorporated in the combined drive and tensioning system 33 in FIGS. 1B, 2B, 3B and 4B.

FIGS. 11 and 12 show better several aspects of the jigging bars 24. They are T-shaped in cross-section and when juxtaposed in pairs as shown better still in FIG. 17, the jigging bars 24 define the slot 26 (not indicated in FIG. 17 or 18), and the slot 26 takes on an inverted-T shape. FIG. 11 shows that the jigging bars 24 are rather slender, preferably about twelve to sixteen feet long (~3½ m and ~5 m). FIG. 12 shows that the jigging bars 24 are substantial in cross-section, comprising in accordance with one preferred and non-limiting embodiment a block two and half inches (~6 cm) wide by one and half inch (~4 cm) high, with a stem one and half inch wide (~4 cm) by one inch tall (2.54 cm).

Figure 17:
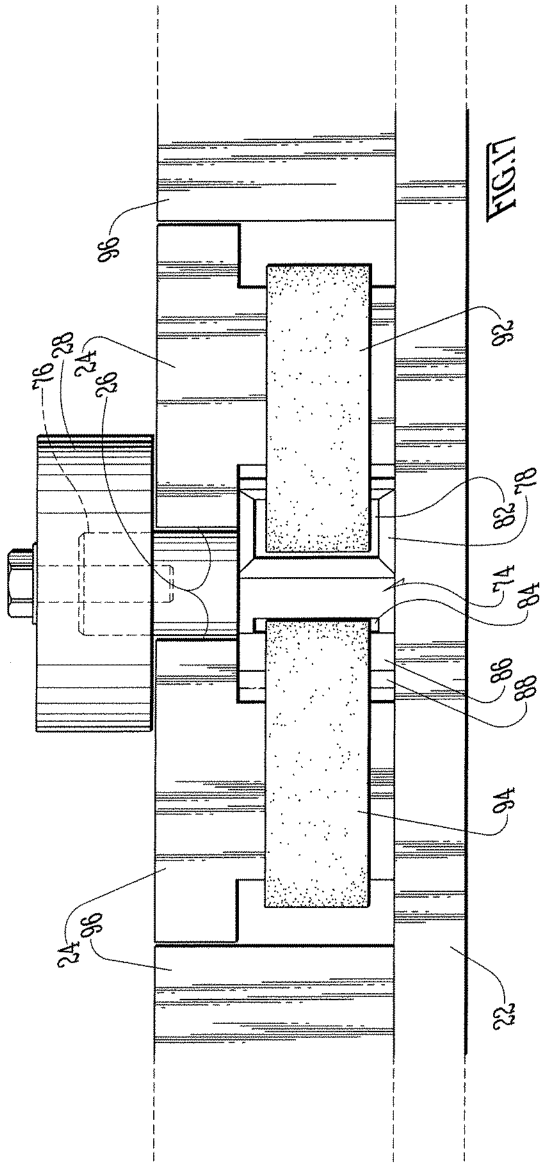
FIG. 17 is an idler-side elevational view of either the FIG. 1A or 1B combined idler system and tensioning system, except:—

FIGS. 13 through 17 show better aspects of the puck carriage 74. FIG. 17 shows better still that the carriage 74 traverses in the slot 26 defined between parallel jigging bars 24.

Figure 13:
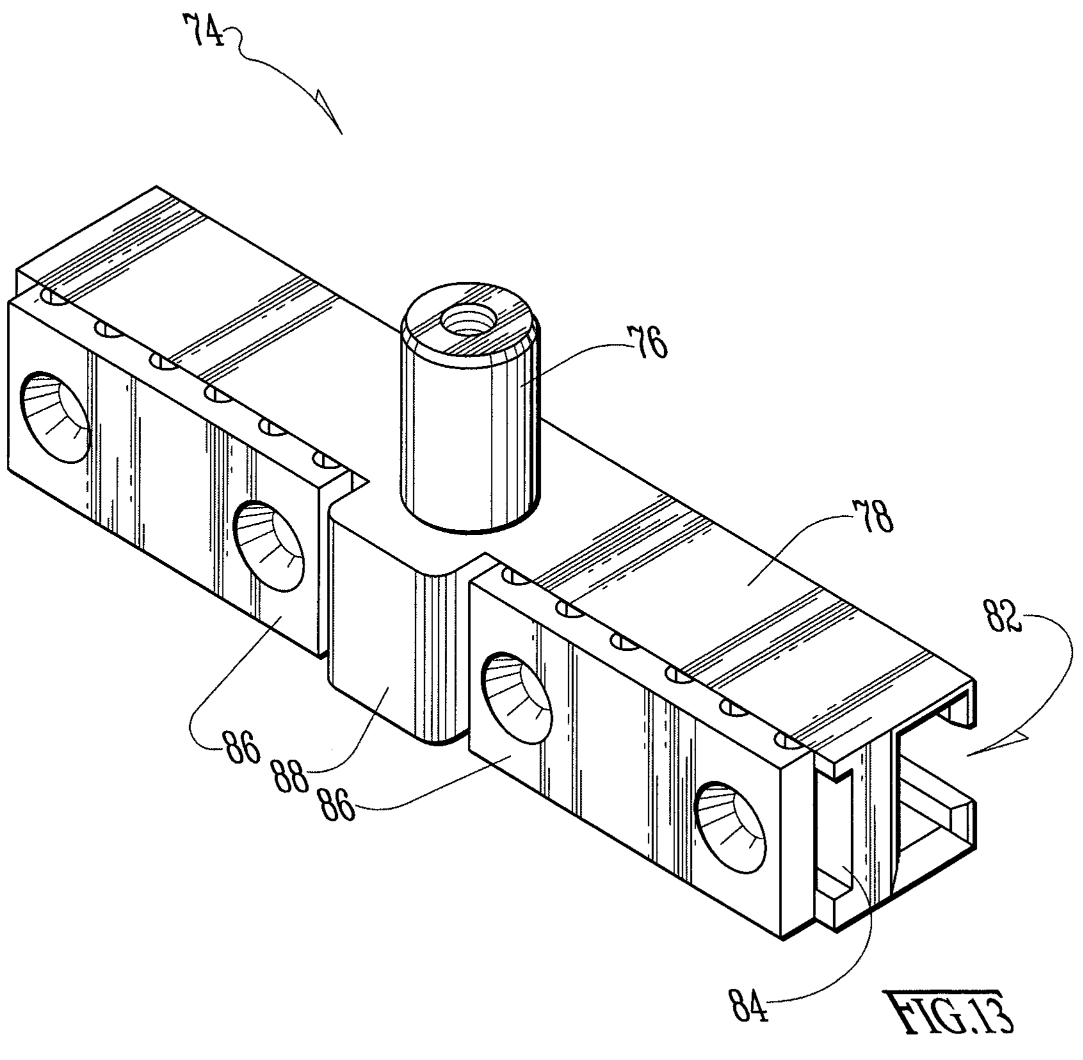
FIG. 13 is an enlarged scale perspective view of a single puck carriage for the truss jigging system in accordance with the invention, wherein an above-table puck as typical of the eight shown in FIG. 1A is removed from view.
Figure 14:
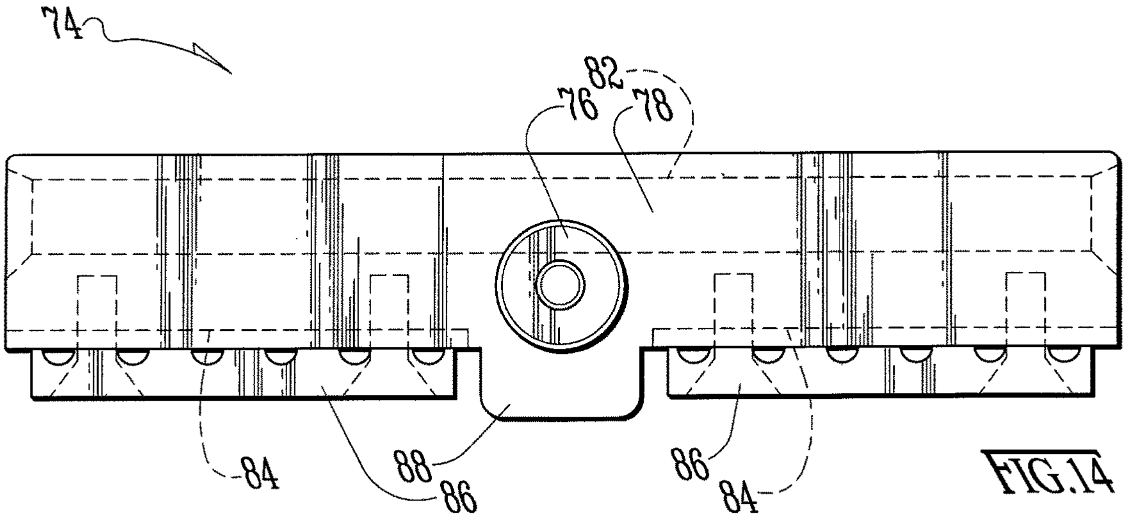
FIG. 14 is a top plan view of FIG. 13.

In FIG. 13, the carriage 74 comprises a main block 78 that carries a puck-mounting pin 76 (again, puck 28 is not shown, but see, eg., FIG. 17).

Figure 15:
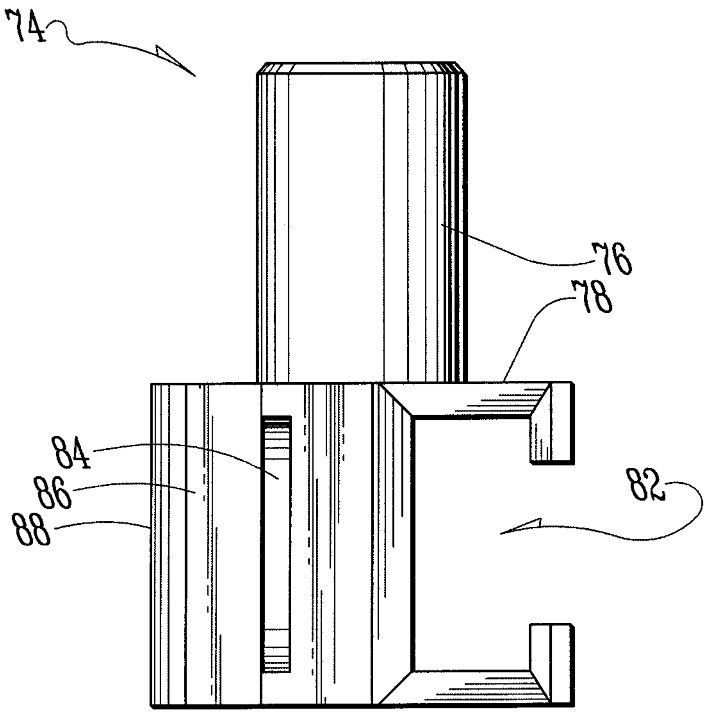
FIG. 15 is an end elevational view of FIG. 13.
Figure 16:
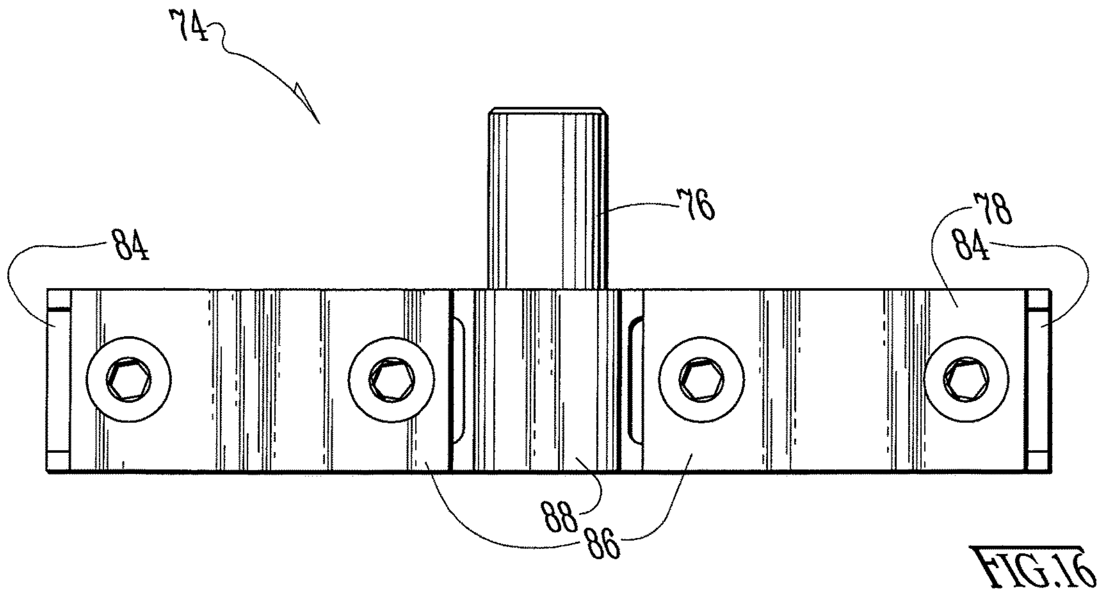
FIG. 16 is a left side elevational view FIG. 13.

As FIG. 15 shows better, the main block 78 defines one and another C-shaped, opposite channels 82 and 84 respectively. Channel 82 is open all the through the axial extent thereof through the main block 78. Channel 84 optionally differs in that it is a clamping channel 84 and is partitioned by slide abutment 88.

FIGS. 13-17 taken together show better aspects of the manner of driving the carriage 74. Each slot 26 that is defined between jigging bars 24 is occupied by two carriages 74, but only one is shown in FIGS. 13-17. This one carriage 74 is driven by an involved belt 94 which has two ends. This carriage 74 also allows a non-involved belt 92 to pass without obstruction for driving another carriage 74 in the same slot (see, eg., FIG. 2A or 2B).

To refer back briefly to FIG. 2A or 2B, each of the pair of pucks 28 carried by its respective carriage 74 in the same slot 26 can traverse that slot 26 independently of each other, but the carriages 74 cannot pass one another. Nevertheless, the pucks 28 can define a spacing between each other.

Resuming again in FIGS. 13-17, the belt ends are not shown but are respectively clamped on one side and the other of the slide abutment 88 of the main block 78 by belt clamps 86. These belt clamps 86 have tooth formations to better clamp the belt 94 and by meshing into the teeth of the belt 94. These belts 92 and 94 are considered to be essentially endless, wherein the carriage 74 merely forms a splice between the opposed tag ends thereof.

Again, the involved belt 94 begins and terminates in channel 84 on opposite sides of the slide abutment 88, the beginning end and the terminating end thereof being clamped to the carriage 74 by belt clamps 86.

From its beginning to its termination, the involved belt 94 occupies one-half of slot 26 (the other half occupied by the non-involved belt 92) and extends from carriage 74 towards drive system 32 or 33 to loop around one drive pulley 38, then extends towards idler system 30 or 31 to loop around one idler pulley 52, and then ultimately returns to its termination about where its beginning is, again at carriage 74.

The T-shaped jigging bars 24 not only form an inverted-T shaped slot which serves as the major slideway for the carriages 74 and locating pins (eg., carrying locating pucks 28). The pair of T-shaped jigging bars 24 also form an outboard pair of tubular conduits for the return runs of the belts 92 and 94 to return through. That is, each belt 92 or 94 comprises an elongated return run and an elongated other run to which one carriage 74 is affixed.

Given the foregoing, the drive pulley 38 that drives this belt 94 and results in moving the carriage 74 in the slot 26. In contrast, turning the other drive pulley 38 that drives belt 92 does not move this carriage 74 in FIGS. 13-17. Belt 92 is free to pass through the carriage 74 by virtue of the open channel 82. Belt 92 is, however, readily available in service of independently driving the other carriage 74 (this other carriage is not shown in FIGS. 13-17) that occupies this slot 26 with the carriage 74 that is indeed shown in FIGS. 13-17.

Briefly, in connection with the clamping channel 84, FIG. 17 shows better that it is served by the sliding abutment 88 sliding against the stem of the adjacent jigging bar 24 in order to avoid sliding contact by either the belt 94 or its clamps 86.

Figure 1A:
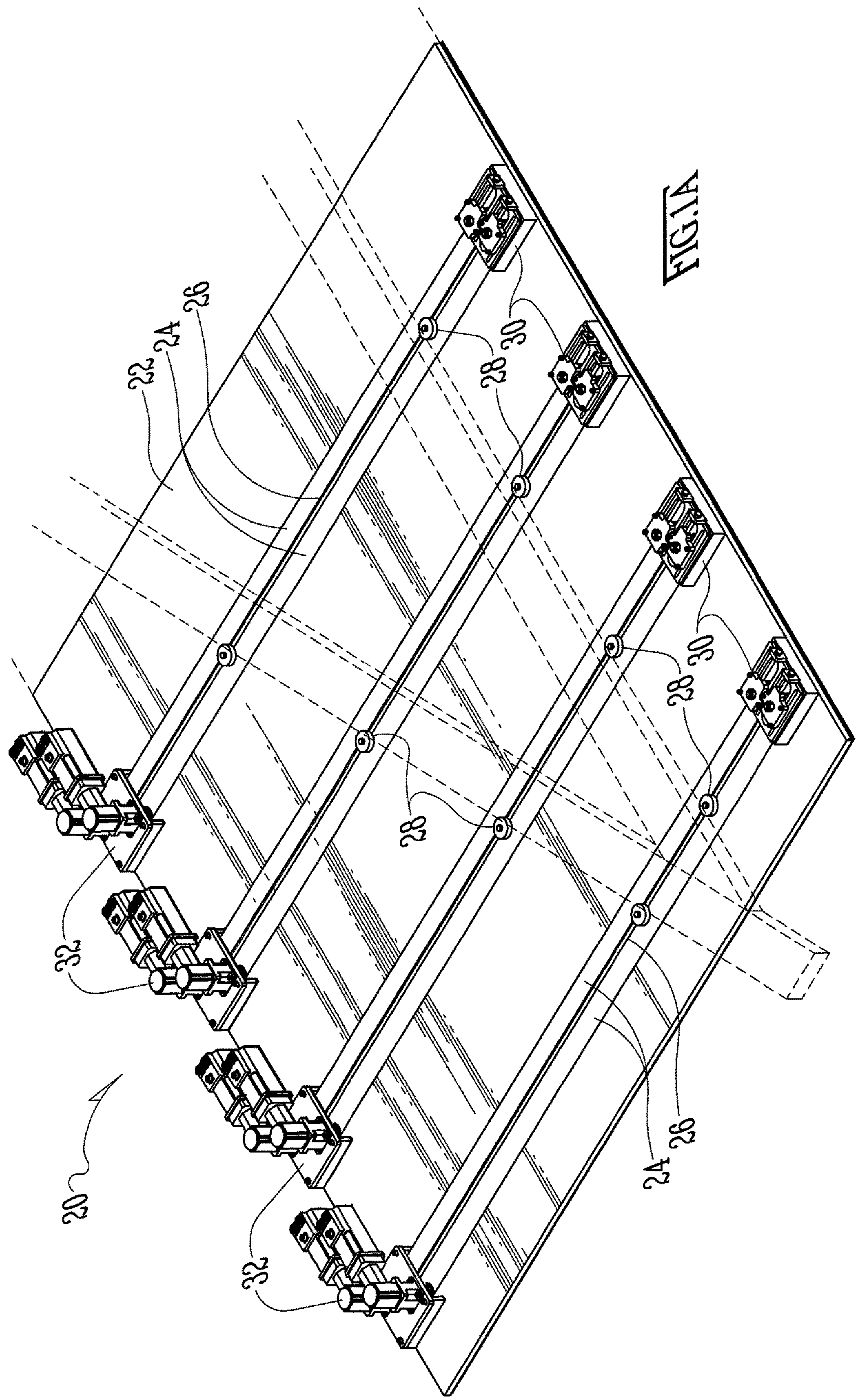
FIG. 1A is a perspective view of a truss jigging system in accordance with the invention, with portions broken away.

FIG. 17 is an idler-side elevational view of either the FIG. 1A or 1B combined idler system and tensioning system 30, except that here in FIG. 17, not only the idler system and tensioning system but also a cover therefor have been removed from view. This is done to reveal how the carriage 74 and locating pin for pucks 28 occupy the inverted-T shaped slot 26 defined by a pair of the T-shaped jigging bars 24 as better shown by FIGS. 11 and 12.

FIG. 17 shows better how the counter-wound endless drive belts 92 and 94 are rigged as well. The locating puck 28 is mounted on the the respective locating pin above the plane of the top surfaces of the T-shaped jigging bars 24. The nut tightening the locating puck 28 to the locating pin can be tightened such that the puck 28 and carriage 74 can clamp on the shoulders of the bars 24 that define the vertical part (eg, upper narrow part) of the inverted-T shaped slot 26. In others the puck 28 can be used as an upper jaw of a clamping feature to clamp it tight in place.

FIG. 17 further shows a pair of infill plates 96 fastened or affixed to the table deck surface 22 flanking the pair of T-shaped jigging bars 24, and creating a table work surface (or work-piece support surface) flush with the elevation of the plane of the top surfaces of the T-shaped jigging bars 24.

Pause can be taken to provide the following remarks, some which might be redundant but are included for better illumination of certain aspects of the invention.

If it is preferred to keep the airspace above the idler-side side edge of the table flush with the work-piece support surface, then preferably the tensioning provisions are moved to the drive-side side edge of the table.

The drive motors are preferably step motors. They can be either vertically mounted or horizontally mounted with a right-angle gear box. The horizontal mounting does provide for lower airspace interference, but if work pieces and completed trusses are always only going to be put on and taken off the table from the idler-side side edge, then this is not a worry.

Direct clamping by tightening nuts on the pucks 28 is desirable when some of the wooden lumber has bows in it. The bow in the lumber can put sufficient lateral pressure on the pucks to move them out of alignment. The pucks can force the belts to drive the motors a little bit. This is especially observed with the vertical mount motors.

While not shown, an alternative drive source for the drive wheels 38 might be a hand crank. In fact, in economic versions of the truss jigging system 20 in accordance with the invention, it might be preferred to provide it in a hand-crank version only. It would further be preferred to provide a digital read-out for the location of the locating pucks 28 (or locating pins).

Figure 6:
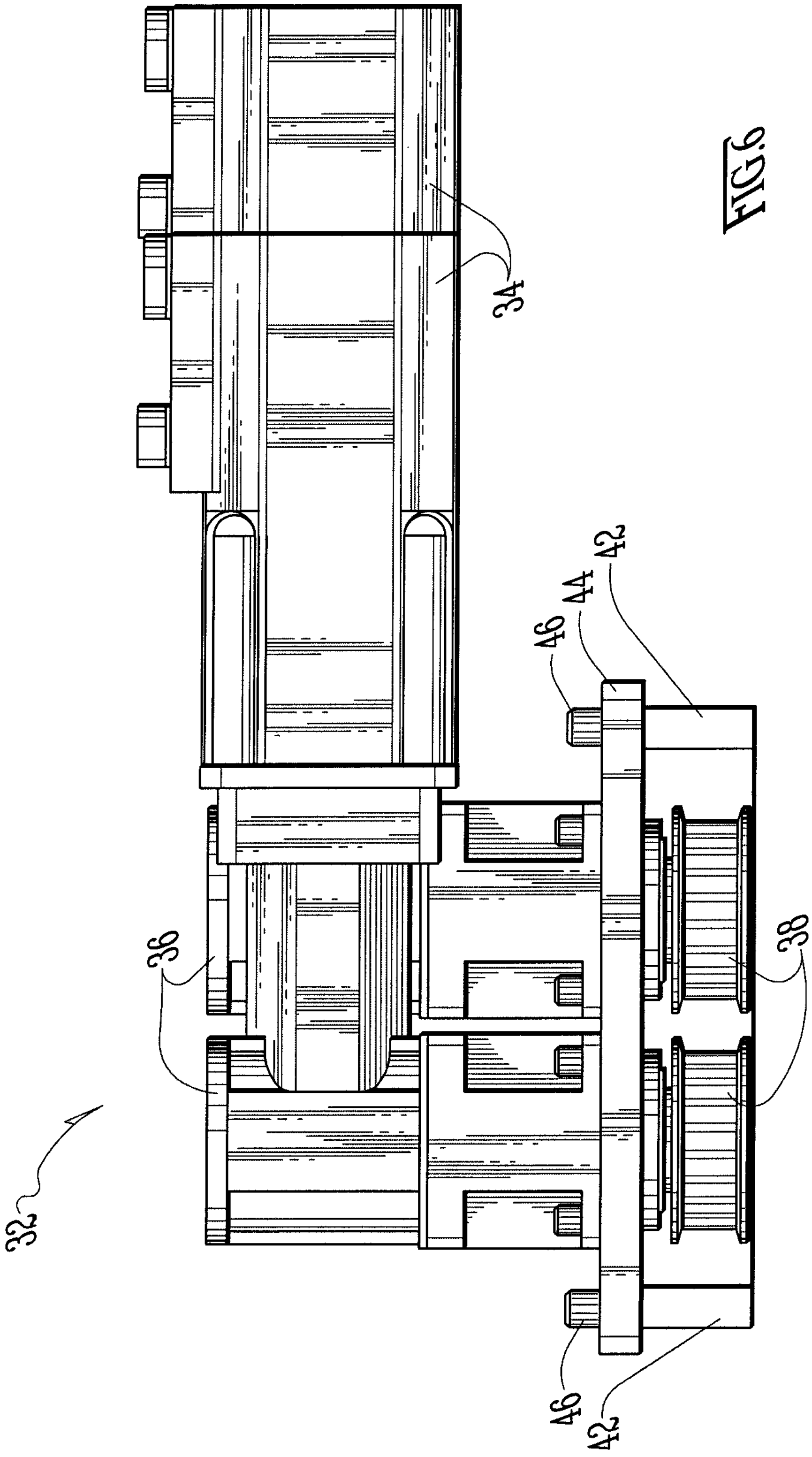
FIG. 6 is an end elevational view FIG. 3A of the inboard edge.

FIGS. 2A and 2B show the general layout of the original concept of the truss jigging system in accordance with the invention. FIGS. 3A, 4A and 6 show the right angle drive system 32 on a fixed base. FIGS. 3B and 4B show a vertical drive system 33 on an adjustable base. FIGS. 7A and 8-10 show the adjustable idler base 30. FIG. 7B shows the fixed, and flush mount, idler base 31.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A truss jigging system comprising:

a table forming a support plane on which truss pieces are supported and extending between a front edge and a spaced-away back edge, thereby defining a front to back direction, and being elongated side to side between a left side edge and a spaced-away right side edge;

the table being formed with a plurality of elongated, narrow surface slots through the support plane and extending on generally parallel axes to each other in the front to back direction, the surface slots being recessed down in the table to widen out into enlarged, tubular slideways that are spaced below the support plane and correspondingly are elongated and extend generally parallel with the same axis as the respective surface slot;

a plurality of locating pins;

a plurality of carriages for not only inserting into the slideways for sliding transit therein but also for carrying one of the plurality of locating pins for sliding transit therewith while the locating pin extends through the surface slot and protrudes above the support plane;

a plurality of endless belts, one of said endless belts for each one of the carriages;

a plurality of idler wheels, one of said idler wheels for each one of the slideways, and each of said idler wheels disposed proximate the front edge of table to service a respective one of the slideways; and a plurality of drive wheels, one of said drive wheels for each slideway, and each of said drive wheels disposed proximate the back edge of table to service a respective one of the slideways;

wherein each one of the endless belts is strung around a respective one of the idler wheels and a respective one of the drive wheels such that each one of the endless belts comprises a pair of elongated runs, one of the runs being an elongated return run between the respective drive wheel and idler wheel, and the other run being spaced and opposite to the one run, said other run having a respective one of the carriages affixed thereto and coursing through the respective slideway that the respective drive wheel and idler wheel service, such that, driving the drive wheel moves the locating pin back and forth along an axis in a front to back direction.

2. The truss jigging system of claim 1, wherein:

the table defines a plurality of inverted-T shaped slots comprising an upper relatively narrower portion above a lower relatively broader portion wherein the upper relatively narrower portions correspond to the surface slots and the lower relatively broader portions correspond to the slideways.

3. The truss jigging system of claim 2, wherein:

the table further comprises a pair of parallel jigging bars for each inverted-T shaped slot.

4. The truss jigging system of claim 3, wherein:

the table further comprises a support deck below the level of and for supporting the jigging bars, the support deck extending between a front edge and a spaced-away back edge and being elongated side to side between a left side edge and a spaced-away right side edge.

5. The truss jigging system of claim 4, wherein:

the jigging bars have top surfaces level with the support plane; and the table further comprises a multiplicity of infill sections which are elongated between a front edge and spaced back edge and compact between a left edge and spaced right edge, and sized for filling in between a bar of a first pair of jigging bars and a bar of a second pair of jigging bars, and said infill section being supported by the support deck for presenting a work surface level with the tops of the jigging bars and level with the support plane.

6. The truss jigging system of claim 5, wherein:

at least one adjacent pair of one of the jigging bars and one of the infill sections define a tubular conduit parallel to the upper relatively narrower portion of the inverted-T shaped slot and providing a passageway for the return run of the endless belt.

7. The truss jigging system of claim 1, further comprising:

a second plurality of plurality of locating pins;

a second plurality of carriages for not only inserting into the slideways for sliding transit therein but also for carrying one of the second plurality of locating pins for sliding transit therewith while said one of the second plurality of locating pins extends through one of the surface slots and protrudes above the support plane;

a second plurality of endless belts, one of said second plurality of endless belts for each of the second plurality of carriages;

a second plurality of idler wheels, one of said second plurality of idler wheels for each one of the slideways, and each of said second plurality of idler wheels disposed proximate the front edge of table to service a respective one of the slideways;

a second plurality of drive wheels, one of said second plurality of drive wheels for each slideway, and each of said second plurality of drive wheels disposed proximate the back edge of table to service a respective one of the slideways;

wherein each of the second plurality of endless belts is strung around a respective one of the second plurality of idler wheels and a respective one of the second plurality of drive wheels to form a pair of elongated runs, one run of the second plurality of endless belts being an elongated return run and the other run of the second plurality of endless belts having a respective one of the second plurality of carriages affixed thereto and coursing through the respective slideway that the respective respective drive wheel of the second plurality of drive wheels and respective idler wheel of the second plurality of idler wheels service such that, driving the respective drive wheel of the second plurality of drive wheels moves the respective locating pin of the second plurality of locating pins back and forth along an axis in the front to back direction; and wherein each said slideway services one carriage of the first plurality of carriage and one carriage of the second plurality carriages, which can be driven independently.

8. The truss jigging system of claim 7, wherein:

the table further defines a pair of tubular conduits flanking each one of the slideways, one of the pair of tubular conduits providing a passageway for the return run of the respective one of the first plurality of endless belts and the other of the pair of tubular conduits providing a passageway for the return run of the respective one of the second plurality of endless belts.

9. The truss jigging system of claim 1, further comprising:

a plurality of drive motors, one of said plurality of drive motors for driving a respective one of the plurality of drive wheels.

10. The truss jigging system of claim 9, further comprising:

a control system for controlling the plurality of drive motors.

11. The truss jigging system of claim 9, wherein:

the idler wheels are mounted to the table below the support plane so that, other than the locating pins and truss pieces, airspace above support plane proximate the front edge of the table is otherwise unoccupied.

12. The truss jigging system of claim 11, wherein:

the plurality of drive motors are mounted to the table along the back edge and project above the support plane.

13. The truss jigging system of claim 9, further comprising:

a plurality of belt tensioning systems, one of said plurality of belt tensioning systems for a respective one of each of the plurality; of belts;

each one of the plurality of belt tensioning systems comprising a horizontally-adjustable mounting provision that is adjustable in the front to back direction and provides a mounting provision for one of the plurality of drive wheels or else one of the plurality of idler wheels.

14. The truss jigging system of claim 1, wherein:

each endless belt comprises an elongate flexible member extending between opposed tag ends which nearly meet each other but each endless belt further includes the respective carriage affixed thereto whereby the carriage forms a splice between opposed tag ends of the belt.

15. A truss jigging system comprising:

a table forming a support plane and having a front edge and back edge thereby defining a front to back direction, and a left edge and right edge;

the table being formed with a plurality of elongated, generally parallel slots extending in the front to back direction and having upper portions and lower portions;

a plurality of locating pins;

a plurality of carriages, one each of said plurality of carriages for inserting into the lower portions of a respective one of the plurality of slots for sliding transit therein, each one of the carriages also carrying a respective one of the plurality of locating pins for sliding transit therewith while the locating pin extends through the slot and protrudes above the support plane;

a plurality of endless belts, one each of said plurality of endless belts for each one of the carriages;

a plurality of idler wheels, one each of said plurality of idler wheels for a respective one of the plurality of slots, and each of the plurality of idler wheels disposed proximate the front edge of table to service the respective slot; and a plurality of drive wheels, one each of said plurality of drive wheels for a respective one of the plurality of slots, and each of the plurality of drive wheels disposed proximate the back edge of table to service the respective slots;

wherein each one of the endless belts is strung around a respective one of the idler wheels and a respective one of the drive wheels such that each one of the endless belts comprises a pair of elongated runs, one run being an elongated return run between the respective drive wheel and idler wheel, and the other run being spaced and opposite to the one run, said other run having a respective one of the carriages affixed thereto and coursing through the respective slot such that, driving the drive wheel moves the locating pin back and forth along an axis in a front to back direction.

16. The truss jigging system of claim 15, wherein:

the table further comprises a pair of parallel jigging bars for defining each one of the slots, and, a support deck below the level of and for supporting the jigging bars;

at least one of the pair of jigging bars defines a tubular conduit parallel to the slot and thereby provides a passageway for the return run of the endless belt.

17. The truss jigging system of claim 15, further comprising:

a second plurality of plurality of locating pins;

a second plurality of carriages for not only inserting into the slots for sliding transit therein but also for carrying one of the second plurality of locating pins for sliding transit therewith while said one of the second plurality of locating pins extends through the respective slot and protrudes above the support plane;

a second plurality of endless belts, one of said second plurality of endless belts for each of the second plurality of carriages;

a second plurality of idler wheels, one of said second plurality of idler wheels for each one of the slots, and each of said second plurality of idler wheels disposed proximate the front edge of table to service a respective one of the slots;

a second plurality of drive wheels, one of said second plurality of drive wheels for each one of the slots, and each of said second plurality of drive wheels disposed proximate the back edge of table to service a respective one of the slots;

wherein each of the second plurality of endless belts is strung around a respective one of the second plurality of idler wheels and a respective one of the second plurality of drive wheels to form a pair of elongated runs, one run of the second plurality of endless belts being an elongated return run and the other run of the second plurality of endless belts having a respective one of the second plurality of carriages affixed thereto and coursing through the slot such that, driving the drive wheel moves the respective locating pin of the second plurality of locating pins back and forth along an axis in a front to back direction.

18. The truss jigging system of claim 17, wherein:

the table further defines a pair of tubular conduits flanking each one of the slots, one of the pair of tubular conduits providing a passageway for the return run of the respective one of the first plurality of endless belts and the other of the pair of tubular conduits providing a passageway for the return run of the respective one of the second plurality of endless belts.

19. The truss jigging system of claim 15, further comprising:

a plurality of drive motors, one of said plurality of drive motors for driving a respective one of the plurality of drive wheels.

20. The truss jigging system of claim 19, wherein:

the idler wheels are mounted to the table flush below the support plane so that, other than the locating pins and truss pieces, airspace above the support plane proximate the front edge of the table is otherwise unoccupied.

* * * * *